Aug. 11, 1964  F. J. REYNOLDS  3,144,262
QUICK CONNECTION FOR MALE-FEMALE COUPLING
Filed July 20, 1961  2 Sheets-Sheet 1
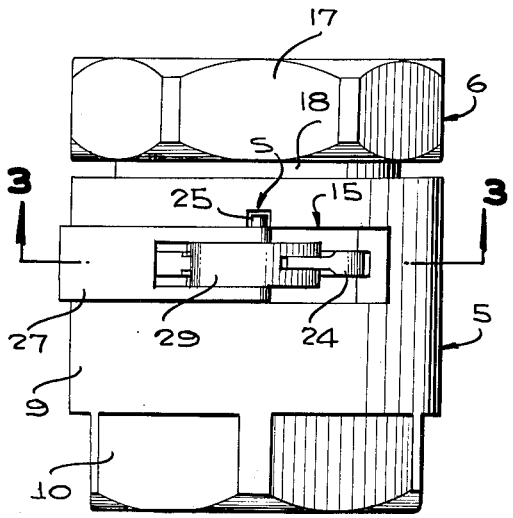
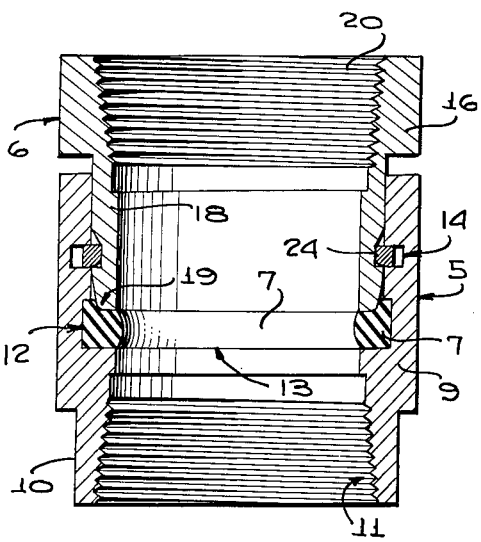
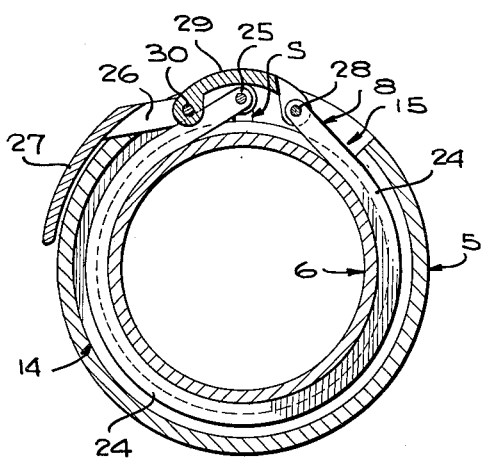
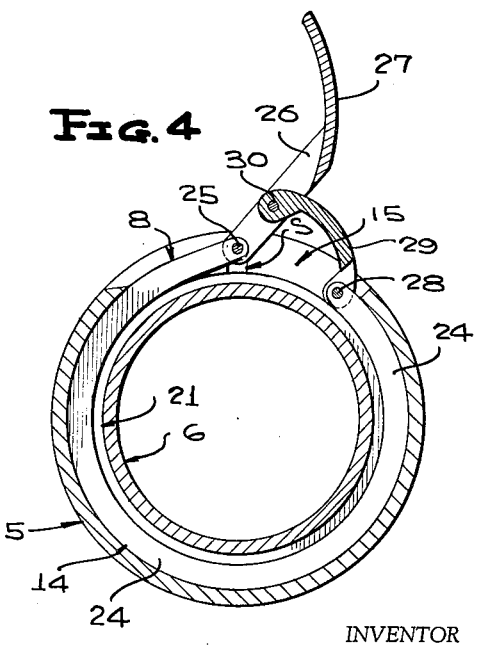
INVENTOR
FRANK J. REYNOLDS
BY
Mason, Porter, Diller & Stewart
ATTORNEYS

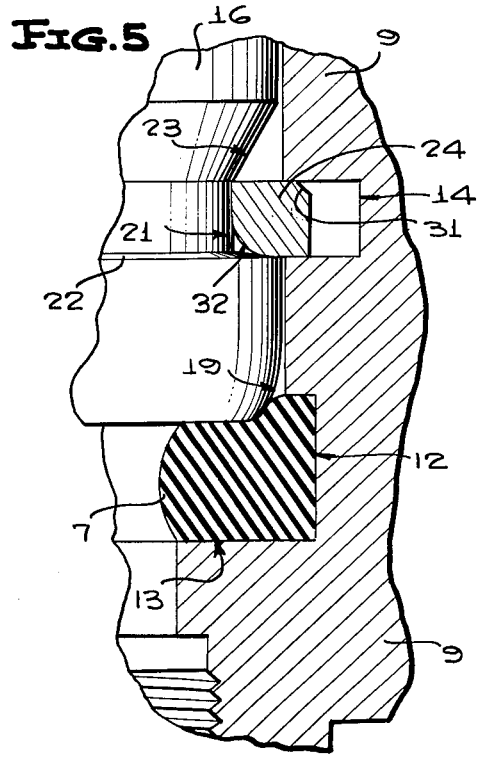
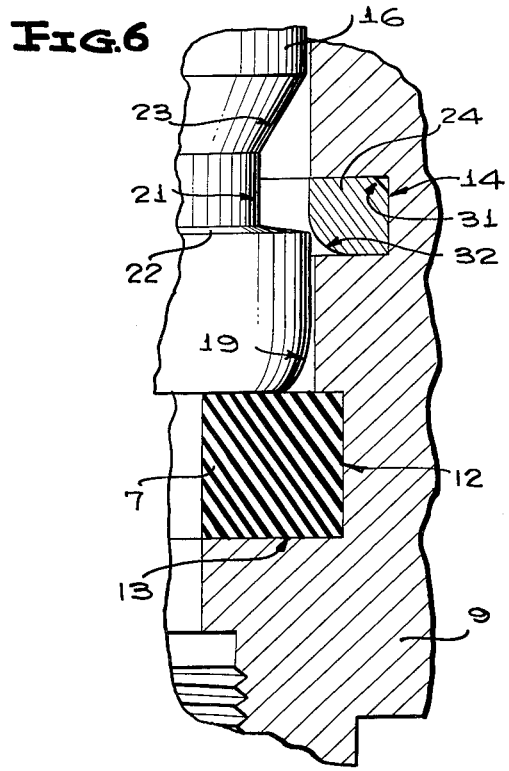
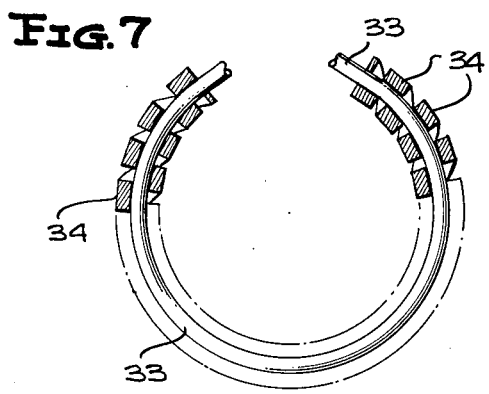
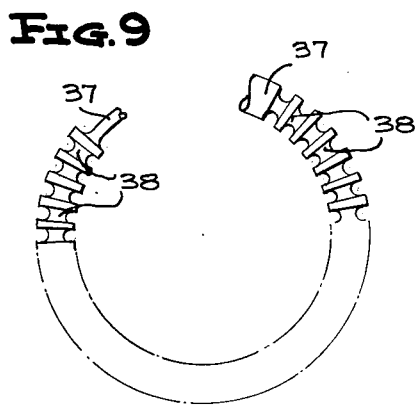
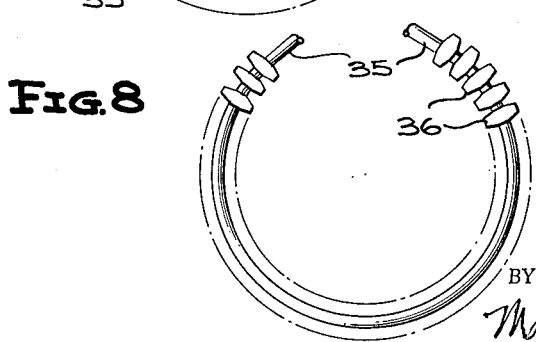

United States Patent Office 3,144,262
Patented Aug. 11, 1964

3,144,262
QUICK CONNECTION FOR MALE-FEMALE
COUPLING
Frank J. Reynolds, Rte. 30, North Brunswick, N.J.
Filed July 20, 1961, Ser. No. 126,804
4 Claims, (Cl. 285—311)

The invention relates generally to couplings such as may be employed for the coupling of conduits, rigid or flexible, and it primarily seeks to provide such a coupling which is quickly attachable and detachable and wherein provision is made not only for secure attachment of the coupled elements one to the other, but also for a sealing of the couple against leakage of fluid being conducted.

An object of the invention is to provide a coupling of the character stated which includes a female tubular element having provision for attachment of a conduit thereto, a male tubular element having a portion for telescoping into the female element and provision for attachment of a conduit thereto, said elements having matching grooving therein, one portion being formed in the male element and a matching portion in the female element, and there also being included an expandable and contractible ring normally expanded into the female element grooving portion, and means for contracting the ring into the male element grooving and only partially out of the female element grooving when said elements are telescoped, thereby to lock the two elements in their telescoped conduit coupling relation.

Another object of the invention is to provide a coupling of the character stated wherein the female element includes an annular shoulder opposing the telescope end of the male element, a sealing gasket is seated on said shoulder in position for being engaged by said end, and means are included for forcing the male element end endwise into fluid sealing contact with the sealing gasket incidental to the contracting of the ring into male and female element locking contact in the male element grooving.

Another object of the invention is to provide a coupling of the character stated wherein the means for forcing the male element endwise comprises a camming surface on the contractible ring engageable with a wall portion defining the male element grooving.

Another object of the invention is to provide a coupling of the character stated wherein the means for contracting the ring comprises a toggle lever and link means connected with opposing ends of the ring, said lever and link means including portions conforming generally to the cross sectional curvature of the coupling.

Another object of the invention is to provide a coupling of the character stated wherein the expandable and contractible ring has an inherent tendency to expand.

Another object of the invention is to provide a coupling of the character stated wherein the expandable and contractible ring comprises a ring core and a core enclosing sheath in the form of a helically wound wire.

A further object of the invention is to provide a coupling of the character stated wherein the expandable and contractible ring comprises a ring core and roller-like elements mounted thereon and thereabout in close relation.

A still further object of the invention is to provide a coupling of the character stated wherein the expandable ring comprises a heavy ring having closely spaced transverse grooving effective to increase the flexibility of the ring and yet present the desired large diameter camming surfaces exteriorly of the ring.

With the above and other objects in view that will hereinafter appear, the nature of the invention will be more clearly understood by reference to the following detailed description, the appended claims and the several views illustrated in the accompanying drawing.

In the drawings:

FIGURE 1 is a side elevation illustrating the invention.

FIGURE 2 is a vertical longitudinal section through the coupling structure shown in FIGURE 1.

FIGURE 3 is a horizontal sectional view taken on the line 3—3 on FIGURE 1.

FIGURE 4 is a view similar to FIGURE 3 with the toggle means shown in the open, ring expanding condition.

FIGURE 5 is an enlarged fragmentary section showing the locking and sealing ring means in the sealing gasket compressing condition.

FIGURE 6 is a view similar to FIGURE 5 showing the locking and sealing ring means in the position illustrated in FIGURE 4, the sealing gasket being in repose.

FIGURES 7, 8 and 9 illustrate other types of locking and sealing ring means employed in lieu of the locking and seal ring shown in FIGURES 2 through 6.

In the practical development of the invention as herein disclosed, the novel quick secured, quick detachable coupling includes a tubular female coupling member generally designated 5, a tubular male coupling member generally designated 6, a sealing gasket 7 and a locking and sealing ring means generally designated 8.

The female coupling member 5 includes a generally cylindrical body 9 having a non-circular or nut portion 10 at one end surrounding an internally threaded portion 11. Inwardly of the threaded portion 11 the body 9 is equipped with an annular groove 12 for receiving the gasket ring 7 and defined at one side by a wide, sealing ring opposing annular seat or shoulder 13. Inwardly of the groove 12, the body 9 is provided with an annular groove 14 in which to receive the locking and sealing ring means generally designated 8. The side wall of the body 9 opposite the groove 14 is cut away or equipped with an opening 15, as best shown in FIGURES 1, 3 and 4 of the drawings.

The male coupling member 6 includes a generally cylindrical body 16 having non-circular or nut portion 17 and a reduced diameter portion 18 dimensioned to telescope into the female member 5 as shown in FIGURE 2. The reduced diameter portion 18 has its end extremity rounded as at 19 to provide a lead-in portion, and at its other end the tubular member 6 is internally threaded at 20. This internally threaded portion 20, and the previously mentioned internally threaded portion 11 of the female coupling member provide for attachment of the coupling members to a pipe or tube section (not shown). The reduced diameter portion 18 of the male coupling member is equipped externally with an annular groove 21 placed to oppose the groove 14 provided internally in the female coupling member body 9, said groove 21 having an abrupt bevelled wall 22 at its end nearest the end extremity 19, and a less abruptly bevelled wall 23 at its other end.

The locking and sealing ring means generally designated 8 includes an expandable and contractible ring portion 24, one end of which is pivoted at 25 to a toggle clamp lever 26 which projects through the coupling member opening 15 and has an arcuate hand grip portion 27 shaped on an arc to adapt it for conforming to the exterior of the coupling in the manner illustrated in FIGURE 3. The other end of the ring 24 is pivotally connected at 28 to an arcuate toggle link 29 which in turn has a pivotal connection at 30 with the toggle clamp lever 26. The pivotal connections at the ring ends may be by means of loose pivot pins 25 and 28, the pins being prevented from falling out by confinement thereof between the walls defining the opening 15 in the male coupling element body 9. One of said opening defining walls is provided with a radial slot S in which an extension of the pivot pin 25 may move. This slot S allows the movement required in expansion and contraction of the ring 24, but prevents the toggle locking and sealing assembly from rotating about the coupling axis within the opening 15. In other words, the engagement of the pin 25 in the radial slot S prevents movement of said pin and the connected ring end relative to the other ring end in a direction about the axis of the coupling.

It will be apparent by reference to FIGURES 4 and 6 of the drawings that the ring 24 is dimensioned to be wholly receivable in the outer groove 14 in the female coupling body 9 when in its expanded condition, and to bridge across the opposing grooves 14 and 21 formed respectively in the female coupling body 9 and the reduced diameter extension 18 of the male coupling member when the ring is in its contracted condition as illustrated in FIGURES 1, 2, 3 and 5. It will be noted by reference to FIGURES 5 and 6 that the ring 24 has one outer corner thereof bevelled at 31, and its opposite inner corner rounded at 32 to provide a camming surface.

In the use of the coupling, the coupling members 5 and 6 are suitably attached to rigid or flexible conduit sections, or combinations thereof, and telescoped as illustrated in FIGURES 1 and 2, but with the toggle clamping means in the opening or ring expanded condition, illustrated in FIGURE 4. By now swinging the toggle clamping lever 26 to its closed condition illustrated in FIGURES 1 and 2, the ring 24 will be contracted to the condition illustrated in FIGURES 2 and 5. During this contraction of the ring, the camming surface 32 on the ring engages with the bevel shoulder 22 of the male element extension groove 21 and forces said extension endwise from the repose condition illustrated in FIGURE 6 to the gasket deforming, coupling sealing condition illustrated in FIGURE 5.

The corner bevelling of the outer surface of the locking and sealing ring 24 serves to facilitate entry of the ring into its receiving groove 14 in the female coupling body 9.

In FIGURE 7 of the drawing, a modified form of locking and sealing ring is illustrated. In this form, the ring includes a core 33 surrounded by a helically wound, rectangular cross section wire 34. The helically wound wire imparts to the ring structure a tendency to expand, and the ring is shown in its expanded condition in FIGURE 7. It is to be understood that when the ring is contracted, the helices of the covering wire will move closer together. The ends of the core 33 are to be understood as being connected to toggle clamp means in the manner illustrated in FIGURES 3 and 4 of the drawings. When the toggle means is moved from the FIGURE 4 condition to the closed or locking condition shown in FIGURE 3, the ring will be contracted and will serve the previously described purpose of locking the male element of the coupling within the female element with the end extremity of the male element extension deforming and engaging in coupling sealing contact with the gasket.

Another modified form of locking and sealing ring is illustrated in FIGURE 8 and in this form, a ring core 35 is provided and the same is surrounded by roller-like disks or beads 36. It is to be understood that this form of ring is to be expanded and contracted and to exercise the previously described coupling element locking and coupling sealing functions.

Still another form of locking and sealing ring is shown in FIGURE 9 wherein the ring is in the form of a one-piece body 37 cross grooved at 38 to reduce the resistance to bending, and yet provides the desired bead-like portions for performing the previously described coupling element locking and sealing gasket deforming function.

While it has been pointed out herein that the ring forming a part of the locking and sealing means generally designated 8 has an inherent tendency to expand, it should also be understood that the ring can be made for use as in a "fail safe" coupling with a tendency to contract. Again, the ring may have a tendency to partially expand where the male element would snap into the female element. In other words, the invention comprehends variations in the coupling wherein the ring might have a tendency to expand or contract, according to particular adaptations of the broad inventive concept.

While preferred and modified part structures and arrangements embracing the invention have been disclosed in detail herein, it is to be understood that variations in the part structures and arrangements may be made without departing from the scope of the invention as defined in the appended claims.

I claim:

1. A quick couple for conduits of the character described comprising a female tubular element having provision for attachment of a conduit thereto, an annular opening in a portion of said female tubular element defining upper and lower spaced walls, one of said walls being provided with a radial slot adapted for reception of a pivot pin, a male tubular element having a portion for telescoping attachment to the female element, said elements having grooves therein, said grooves including a groove formed in the male element having at least one innermost beveled wall and a mating groove in the female element opposite said male element groove when the elements are telescoped, a split ring normally disposed within the female element groove and including an innermost rounded camming surface thereon engageable with the one beveled wall of the male element groove, said male element having a rounded extremity, said female element including an annular shoulder opposing the rounded extremity of said male element, a sealing gasket seated on said annular shoulder in a position for engagement by said rounded extremity of the male element, a toggle lever and link means connected with opposing ends of the ring for contracting the ring and wherein the connection between the toggle lever and link means includes a pivot pin and at least one portion of said pin being confined in the radial slot for holding one end of the ring against movement about the coupling axis.

2. A couple as defined in claim 1 wherein the ring comprises a ring core and a core enclosing sheath in the form of a helically wound wire and constructed and arranged to cammingly unite the male and female elements upon contraction of said ring.

3. A couple as defined in claim 1 wherein the ring comprises a ring core and roller-like elements mounted on and thereabout in close relation and constructed and arranged to cammingly unite the male and female elements upon contraction of said ring.

4. A couple as defined in claim 1 wherein the ring comprises a heavy ring having closely spaced transverse grooving effective to increase the flexibility of the ring and yet provide the desired large diameter camming surfaces exteriorly of the ring and constructed and arranged to cammingly unite the male and female elements upon contraction of said ring.

References Cited in the file of this patent

UNITED STATES PATENTS

| | | |
|---|---|---|
| 1,230,606 | Saunders | June 19, 1917 |
| 1,261,687 | Brandon | Apr. 2, 1918 |
| 1,518,479 | Brewer | Dec. 9, 1924 |
| 1,586,276 | Woodruff | May 25, 1926 |
| 1,825,774 | Boynton | Oct. 6, 1931 |
| 2,866,243 | Grimal | Dec. 30, 1958 |
| 2,922,665 | Beyer | Jan. 26, 1960 |

FOREIGN PATENTS

| | | |
|---|---|---|
| 809,914 | France | Dec. 19, 1936 |
| 911,562 | Germany | May 17, 1954 |
| 946,580 | Germany | Aug. 2, 1956 |